UNITED STATES PATENT OFFICE.

MICHAEL NEUMANN, OF RAAB, HUNGARY, AUSTRIA.

MANUFACTURING ARTIFICIAL WOOL FROM VEGETABLE FIBER.

SPECIFICATION forming part of Letters Patent No. 241,056, dated May 3, 1881.

Application filed January 26, 1881. (No specimens.) Patented in Germany October 19, 1879, in Great Britain December 17, 1878, and in Belgium December 11, 1878.

*To all whom it may concern:*

Be it known that I, MICHAEL NEUMANN, of Raab, in the Kingdom of Hungary and Austrian Empire, have invented certain Improvements in Manufacturing Artificial Wool from Vegetable Fiber, of which the following is a specification.

My invention relates to the manufacture of artificial wool from jute, flax, nettle, rhea, and other similar vegetable fibers.

The chief object of my said invention is to treat vegetable fibers so that they possess a wool-like appearance and a fine gloss, and that when mixed or spun with wool they can be dyed of precisely the same color as the animal wool with which they are mixed.

In employing vegetable fibers mixed with animal fibers it was hitherto necessary to dye the wool or animal fibers and the vegetable fibers before mixing the same, as the vegetable fibers would not take the same color with the animal fibers under like treatment. If dyed together, unequal colors were produced. This unequal dyeing of the animal and the vegetable fibers arises from the presence of gum or resinous matter in the cells of the fiber.

According to my invention the gum or resinous matter is entirely removed from the cells of the fibers, so that when the same are dyed with animal wool they assume a like color with the said wool or animal fibers.

In carrying out my invention I employ a vat or other suitable vessel containing about six hundred gallons, or twenty-four hundred liters, which said vat is filled about two-thirds full of water. Caustic lye or caustic soda is now added to the said water until the areometer shows about 3° Baumé. About two hundred-weight of fibrous matter, such as jute, tow, flax-waste, nettle, or other fiber, is now immersed in this bath, which is heated up to, say, 175° centigrade by means of steam. The steam is introduced into the vessel through a perforated serpentine tube at the bottom of the vat, which said serpentine tube is in connection with the boiler of a suitable machine. The fibers remain in this hot solution for half an hour, or somewhat longer, according to the quality of fiber employed. For softening the fiber a small quantity of ordinary washing-soap can be added to the bath, and if no caustic lye or caustic soda is to be had, ordinary soda in suitable proportion can be employed. After this bath the fibers are placed in a washing-machine, where they are thoroughly washed and rinsed. The said fibrous matter is now placed in a second vat of like size with the first vat, which is also filled with boiling water up to about two-thirds of its capacity. About sixty-two grams of sulphate-of-ammoniac copper ($CuO,SO_3 + CuO,NH_4O$) and four pounds of soda are now dissolved in this quantity of water. The fibrous material remains in this bath half an hour, when it is removed and again thoroughly washed and rinsed, after which the same can be dried in the open air or in a suitable drying-room.

If no soda is employed, a proportionately increased quantity of sulphate-of-ammoniac copper or its equivalent must be used.

If it is not requisite that the artificial wool be very pliant, glossy, and specially wool-like, the sulphate of ammoniac copper bath can be omitted.

Before drying the artificial wool the fibers can be bleached by any suitable process—for instance, by being immersed in a bath of chlorate of lime with an admixture of sulphate of magnesia. After bleaching, the said artificial wool can be immersed for half an hour in a weak bath of sulphurous acid and then thoroughly washed and rinsed, whereby it attains an extraordinary degree of gloss. As soon as the fibers have been well dried they are passed through the opener, carded, and prepared for spinning in precisely the same manner as animal wool.

Having now described my said invention of improvements in the manufacture of artificial wool and the manner of carrying the same into effect, I wish it to be understood that I do not confine myself to the exact proportions as given in the said foregoing specification, as the same can be varied without departing from the chief features of my said invention; but

What I do claim, and desire to secure by Letters Patent, is—

1. The process of making artificial wool from vegetable fiber, consisting in first treating the fiber with a hot bath of caustic lye or soda to free the cells from gum and resinous matter, then treating the resultant fibrous material with a solution of sulphate-of-ammoniac copper and soda, and then bleaching and drying.

2. The process of treating the bleached material produced by the described process with sulphurous acid, for the purpose set forth.

MICHAEL NEUMANN.

Witnesses:
JOHN VANLOHE,
L. HEYER.